United States Patent [19]

Mount

[11] Patent Number: 4,509,372
[45] Date of Patent: Apr. 9, 1985

[54] ACOUSTICAL WAVE FLOWMETER WITH INCREASED DENSITY CAPABILITY

[75] Inventor: Bruce E. Mount, Diamond Bar, Calif.

[73] Assignee: The Perkin-Elmer Corporation, Norwalk, Conn.

[21] Appl. No.: 482,104

[22] Filed: Apr. 4, 1983

[51] Int. Cl.³ .............................................. G01F 1/66
[52] U.S. Cl. .............................................. 73/861.28
[58] Field of Search ........................ 73/861.27, 861.28

[56] References Cited

U.S. PATENT DOCUMENTS

| 4,164,865 | 8/1979 | Hall et al. ........................... 73/861.28 |
| 4,372,167 | 2/1983 | Loveland ........................... 73/861.28 |

FOREIGN PATENT DOCUMENTS

| 0056137 | 7/1982 | European Pat. Off. ......... 73/861.18 |
| 0056135 | 7/1982 | European Pat. Off. ......... 73/861.18 |

Primary Examiner—Charles A. Ruehl
Attorney, Agent, or Firm—Randall G. Wick; Thomas P. Murphy; Edwin T. Grimes

[57] ABSTRACT

In a flowmeter system having a transducer assembly defining a path for confining the flow of fluid medium there through and with first and second acoustic transducer elements disposed along said flow path for generating and receiving acoustic compression waves in the fluid medium, a phase-locked loop transmitter/receiver system including a voltage-controlled oscillator for adjusting the frequency of the acoustic compression waves to maintain the compression wavelength constant, together with circuitry for measuring the phase difference of the received acoustic compression waves relative to the applied electrical signal and circuitry for producing a signal representative of both the velocity of sound in the fluid medium and the direction and magnitude of the flow, the improvement in the circuitry which enables operation over a wider range of fluid density by causing the operating phase of the system phase-locked loop to vary in a continuous manner according to a previously determined relationship of phase-versus-resonant frequency, and the loop acquisition frequency to vary in a continuous manner according to a previously determined relationship of amplitude-versus-resonant frequency, of the transducer due to the density of the fluids being measured. Disclosed are three embodiments of the improved circuitry which vary the phase-locked loop operating phase and acquisition frequency, either nonlinearly or linearly, depending on the density range of the gases to be monitored.

15 Claims, 16 Drawing Figures

*TIMING DIAGRAM*

WORKS FROM 100% N₂O (32KHz) TO 40°C AIR (42KHz) BUT FULLSCALE REDUCED FROM 5 l/S MAX. DOWN TO 1.5 l/S MAX.

FIG. 11

PHASE-LOCKED LOOP OPERATING PHASE VS. FREQUENCY

ACOUSTICAL WAVE FLOWMETER WITH INCREASED DENSITY CAPABILITY

RELATED PATENTS AND APPLICATIONS

U.S. Pat. No. 4,003,252 entitled "Acoustical Wave Flowmeter" by E. J. DeWath, dated Jan. 18, 1977, U.S. Pat. No. 4,164,865 entitled "Acoustical Wave Flowmeter" by L. G. Hall and R. S. Loveland, dated Aug. 21, 1979, U.S. Pat. No. 4,345,479 entitled "Flowmeter System with Synchronous Clock for Generation of Timing Signals" by R. S. Loveland, dated Aug. 24, 1982, U.S. application, Ser. No. 224,785 entitled "Flowmeter Systems with Ultrasonic Energy Improvement in Equilibration" by R. S. Loveland, filed Jan. 13, 1981, U.S. application, Ser. No. 224,725 entitled "Flowmeter System with Improved Dynamic Range" by R. S. Loveland, filed Jan. 13, 1981, U.S. Pat. No. 4,372,167 entitled "Flowmeter System with Improved Loop Gain" by R. S. Loveland, dated Feb. 8, 1983, U.S. Pat. No. 4,372,166 entitled "Flowmeter System with Digital Phase Shifter and Calibration" by R. S. Loveland, dated Feb. 8, 1983, and, U.S. application entitled "Ultrasonic Air Flow Transducer for High Humidity Environments" by Bruce E. Mount and Con D. Rader, Ser. No. 316,177, filed Oct. 29, 1981.

BACKGROUND OF THE INVENTION

This invention relates to acoustical flowmeter systems and is particularly directed to an improvement in the acoustical flowmeters of the type described and claimed in the U.S. Pat. No. 4,003,252 entitled "Acoustical Wave Flowmeter" by E. J. DeWath which issued Jan. 18, 1977 and in the flowmeter system of type described and claimed in the U.S. Pat. No. 4,164,865 entitled "Acoustical Wave Flowmeter" by L. G. Hall and R. S. Loveland which issued Aug. 21, 1979.

The invention of DeWath was directed to a flowmeter with two spaced apart transducer elements and unobstructed tubular wall thereby eliminating all impediments to the flowpath of the fluid where debris might collect. The advantages of such a configuration are fully set forth in the DeWath patent. To measure the flow of a selected fluid in DeWath flowmeter, however, a calibration for that selected fluid was required, but, if the flow of a different fluid was to be measured, a recalibration was required since the DeWath flowmeter was not responsive to changes in fluid species or densities.

The Hall and Loveland invention improved the DeWath flowmeter by providing a flowmeter that measured the flow accurately regardless of changes in fluid composition or temperature and by providing a flowmeter with a means of determining a change in the velocity of sound in the fluid being measured.

In order to accomplish this, the Hall and Loveland acoustical wave flowmeter system like the DeWath flowmeter had two spaced apart transducer elements in the wall of the flowmeter conduit (sometimes called a cavity) to produce ultrasonic acoustic compressions at selected frequencies in the fluid within the cavity. The transducer elements were alternately switched into a transmit and a receive mode to generate upstream and downstream transmitted and received signals with an automatic means to adjust the transmitted frequencies to compensate for changes in velocity of the acoustic compressions in the fluid caused by changes in fluid composition or temperature. The electronic circuitry involved in the Hall and Loveland flowmeter included means for measuring and storing signals representing the phase difference between the transmitted transducer element signals producing the acoustical compressions and the signals produced by the receiving transducer element in response to the received acoustic compressions during each of two successive transmit/receive cycles. Circuit means were provided to determine the difference between the signals representing the two successive phase differences with the sign of the difference corresponding to the direction of the fluid flow and the magnitude of the difference corresponding to the rate of flow through the flowmeter. Circuit means were also provided to add the two successive phase difference signals together to obtain a signal proportional to the velocity of sound in the flowmeter representing fluid density so that any change in the signal indicated a change in the composition of the fluid in the meter.

It is to be noted, before going further, that the term "transducer" has been heretofore used in two contexts. The two spaced-apart "transducers" which produce the acoustical waves in response to applied signals and which produce a signal in response to the acoustical waves are, in fact, "transducers" and the flowmeter conduit containing the two spaced apart "transducers" and through which the fluid flows is, in fact, a transducer and also sometimes called a "transducer" or a "transducer assembly" or a "meter". Now in order to distinguish the "transducers", the two spaced apart "transducers" will be called "transducer elements" and the conduit containing the "transducer elements" will continue to be called the "transducer" or "transducer assembly" or "meter", Now continuing on, the circuitry of the Hall and Loveland flowmeter system has undergone a number of improvements, for example, by the invention in U.S. Pat. No. 4,345,479, supra, the clock system has been made synchronous within the system for generation of precise timing signals for the control of the system circuitry, the measurement of the energy at a certain time to produce an accurate phase measurement was improved by the invention in the U.S. application entitled "Flowmeter Systems for Ultrasonic Energy Improvement in Equilibration" filed Jan. 13, 1981, supra, the dynamic range of the system was improved by the invention in U.S. application entitled "Flowmeter System with Improved Dynamic Range" by R. S. Loveland, supra, the gain of the flowmeter system was improved by the invention in the U.S. Patent entitled "Flowmeter System with Improved Loop Gain", supra, and a digital phase shifter and a means for calibrating the system was introduced into the system by the invention in the U.S. Patent entitled "Flowmeter System with Digital Phase Shifter and Calibration", supra.

Too, certain models of the transducer, itself, have been imoroved for use in high humidity environments, which are quite hostile to the proper operation of the system, such as in an intensive care unit (ICU) of a hospital, by the invention in the U.S. application of Bruce Mount and Con Rader entitled "Ultrasonic Airflow Transducer for High Humidity Environments", supra.

It was in the hospital use that the flowmeter system, whether or not incorporating any or all of the above improvements to the Hall and Loveland circuitry, was found to be needing still further improvement. In the use of the flowmeter system in the operating room for measurement of anesthetic gas flow, the variation in the density of the anesthetic gases required to be monitored simply could not be handled by the existing flowmeter systems. For example, the Hall and Loveland flowmeter, with certain of the above mentioned improvements, has proven to be satisfactory for gases of limited density range (typically, 10% $CO_2$, balance air, to air at 35° C.) but with gases of higher density, such as those required to be monitored for anesthetization purposes typically 3% halothane, 47% $N_2O$, and 50% $O_2$, (considered equivalent in density to 100% $N_2O$), or with gases of lower density such as air at 40° C., or 10% He balance $O_2$, the flow measurement is not satisfactory. The reason for the unsatisfactory operation is that the phase-locked loop is unable to maintain a stable, locked condition for gases of density greater than 10% $CO_2$, balance air, or of density less than air at 35° C. due to a change in the transducer resonant characteristics. As a result, the system would go to an out-of-lock mode in the extreme density (higher or lower) ranges. The cause of the change in transducer resonant characteristics with increased density is not fully understood but the effect is that the response characteristic of the transducer undergoes a phase response change as well as an amplitude response change as a function of gas density. For example, the optimum operating phase for high-density anesthetic gas changes by up to $+180°$ from the optimum operating phase in air and, conversely, at low densities, the operating phase changes in the negative direction from the optimum in air, while the amplitude response peaks at about 10% $CO_2$ balance air, and decreases for gases of higher or lower density.

Figure 1:
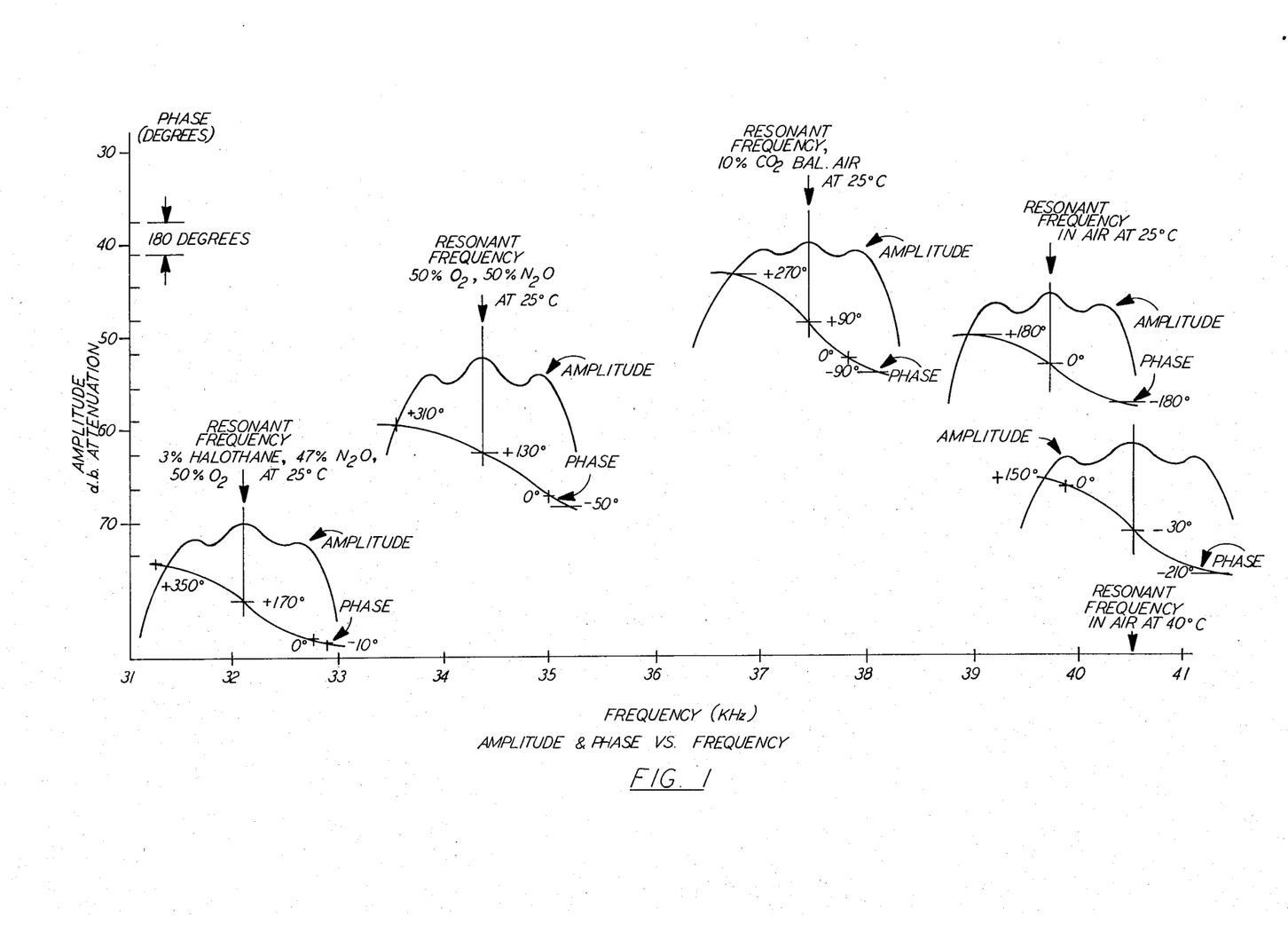
FIG. 1 is a chart (Amplitude and Phase Versus Frequency) showing the envelope-detected amplitude and resonant frequencies of the transducer with various gases.

To better understand the need for this invention, attention is directed to FIG. 1 which is a chart with the electrical output amplitude (db attenuation) and phase-shift (degrees) plotted against frequency (KHz). This chart was generated by actual tests on the various gases used in anesthesiology, when it was found that the present circuit was incapable of handling such gases. In this chart, it can be seen that the resonant frequency of the flow transducer in air at 25° C. is approximately 39.5 KHz and the resonant frequency in air at 40° C. is approximately 40.5 KHz. On the other hand, a gas which is 10% $CO_2$ balance air, causes the transducer to resonate at a frequency of about 37.3 KHz, a gas which is 50% $O_2$ 50% $N_2O$ produces a resonant frequency of approximately 34.3 KHz, and a typical anesthetic gas that is equivalent in density to 100% $N_2O$ (3% halothane, 47% $N_2O$ and 50% $O_2$) produces a resonant frequency of 32 KHz. Also, from the chart it can be seen that, if the system were calibrated in air at 25° C. at its resonant frequency (which is required, since for use in anesthesiology air must be measured as well as other gases), the phase-locked loop would be referenced to 0° of phase-shift. Note that the output amplitudes of the transducer, when it is operating with the other gases, varies from a high amplitude with the gas which is 10% $CO_2$ balance air, to a very low amplitude with the gas which is 100% $N_2O$ but, more importantly, using 0° as the optimum operating phase in air at 25° C., the optimum operating phase in air at 40° C. would be approximately $-30°$, whereas, the optimum operating phases for the other three gases would be $+90°$, $+130°$ and $+170°$, respectively. Since a normal phase-locked loop will try to maintain operation at the reference phase (in this case, 0°), it can be seen that the operating frequency of the transducer will be forced away from the ideal operating frequency in all other gases but air at 25° C.

This affects the capability of the system to monitor the flow of the fluids by limiting the operating range of the system (referenced to air at 25° C.) from a gas density equivalent to 10% $CO_2$, balance air, to air at approximately 35° C. Note, also, the phase-versus-frequency variation, at resonance of the transducer operating with various gases, is nonlinear, so a linear phase-shift compensation means added to the system would not suffice for flow measurement of all the gases under consideration. It is also apparent from FIG. 1, that the amplitude-versus-frequency variation at resonance of the transducer, operating with various gases, is nonlinear, so a nonlinear amplitude compensation means must be added to the system.

Accordingly, an object of this invention is to improve an acoustical wave flowmeter to enable operation with a wider range of gas densities than possible with the existing art acoustical wave flowmeters.

A more specific object of this invention is to provide an acoustical wave flowmeter so that the operating phase of the phase-locked loop will vary in a continuous manner according to a previously determined nonlinear relationship of phase-versus-operating frequency and so that the loop acquisition frequency of the phase-locked loop will vary in a continuous manner according to a previously determined nonlinear relationship of amplitude-versus-resonant frequency of the transducer in order to maintain a transducer at its optimum operating characteristics.

Still another and more specific object of this invention is to provide a flowmeter capable of monitoring gases used in anesthesiology.

SUMMARY OF THE INVENTION

In a flowmeter system having a transducer assembly defining a path for confining the flow of fluid medium there through and with first and second acoustic transducer elements disposed along said flow path for generating and receiving acoustic compression waves in the fluid medium, a phase-locked loop transmitter/receiver system including a voltage-controlled oscillator for adjusting the frequency of the acoustic compression waves to maintain the compression wavelength constant, together with circuitry for measuring the phase difference of the received acoustic compression waves relative to that transmitted and circuitry for producing a signal representative of both the velocity of sound in the fluid medium and the direction and magnitude of the flow, the improvement in the circuitry which enables operation of a wider range of fluid density by causing the operating phase of the system phase-locked loop to vary in a continuous manner according to a previously determined nonlinear relationship of phase-versus-resonant frequency of the transducer due to the density of the fluid being measured, and by causing the phase-locked loop acquisition frequency to vary in a continuous manner according to a previously determined nonlinear relationship of amplitude-versus-resonant frequency of the transducer due to the density of the fluid being measured. Three embodiments of the phase-locked loop transmitter/receiver system incorporating the circuitry improvement are disclosed. In two embodiments a nonlinear function generator is located at different positions in the circuitry and in the third embodiment a phase-locked loop reference is used, but the latter is limited in the range of gas densities that can be accommodated. Useable with all three embodiments is a nonlinear function generator which compensates for the changes in amplitude of the resonant operating characteristic of the transducer when various gases are utilized.

DETAILED DESCRIPTION

FIG. 1 has been described in connection with the BACKGROUND OF THE INVENTION as part of the problem solved by this invention. How this chart and the invention correlate will become apparent from the on-going description hereinafter.

Figure 2:
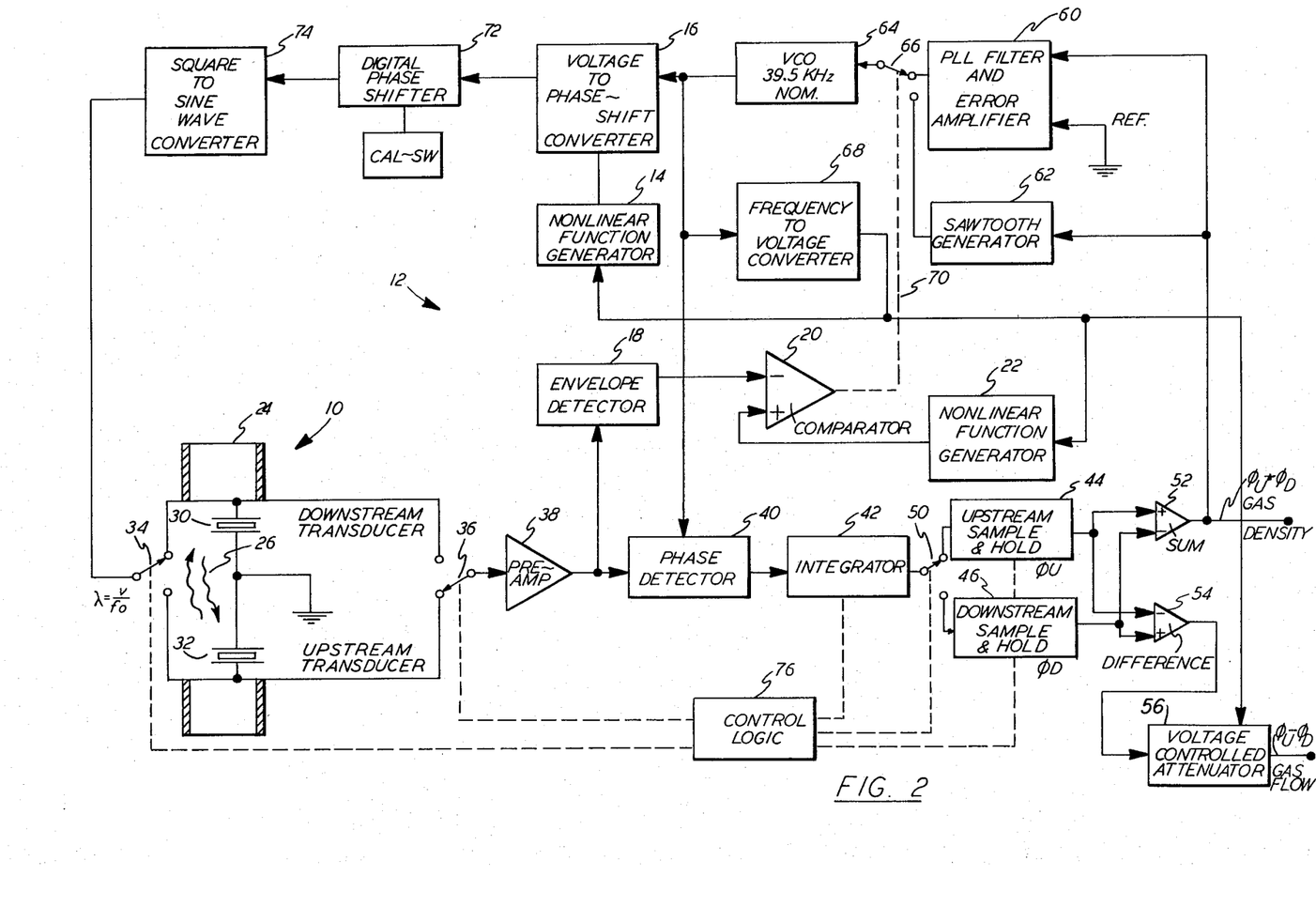
FIG. 2 is a simplified block diagram of the flowmeter system incorporating this invention.

FIG. 2 illustrates the flowmeter system of the present invention which includes a transducer assembly 10, and control circuitry therefor, indicated in its entirety as 12. In the control circuitry, attention is directed, first of all, to a first circuit comprising a first nonlinear function generator 14 and a voltage-to-phase-shift converter 16 and to a second circuit comprising an envelope detector 18, a comparator 20 and a second nonlinear function generator 22. These circuits function to maintain the transducer at its optimum operating characteristic in order to provide the flowmeter with the capability of monitoring gases of widely varying densities such as shown in FIG. 1. How these circuits function with the remainder of the control circuitry will be described hereinafter in greater detail.

The transducer assembly 10 is made generally in accordance with the description of the U.S. Patent to DeWath, supra, and comprises a substantially cylindrical body 24, shown in FIG. 2 in longitudinal section, whose inner diameters are substantially coextensive with the cylindrical bore so that the wall is substantially uniform with no obstructions to provide an impediment for the flow of fluid there through. The purpose of this arrangement is described in the DeWath patent and in the Hall and Loveland patent, supra.

The Hall and Loveland patent as well as the patents and applications, identified supra, showed and described in great detail, control circuiry for operating the transducer assembly in order to accomplish the desired results. For the purpose of this invention, however, this circuitry has been simplified into block diagrams and reference can be made to the Hall and Loveland patent or to the other patents and applications, if more detailed information on the operation of the circuitry is thought necessary.

As can be seen in FIG. 2, the two ultrasonic transducer elements 30 and 32, represented by crystals in this figure, are alternately each connected to the transmission control circuitry, via switch 34. When one transducer element is connected to the transmission circuitry, via the switch 34, the other transducer element is in a receive mode, the output of which, in turn, is connected via a second switch 36 to a preamplifier 38, to a phase detector 40, and to the envelope detector 18. The output of the phase detector 40 is connected to a signal integrator 42 and to upstream and downstream sample-and-hold circuits 44 and 46 via still another switch 50. The outputs of these two sample-and-hold circuits 44 and 46, are connected to two operational amplifiers, one identified as a summing amplifier 52 and the other identified as a difference amplifier 54. The output of the summing amplifier 52 ($\phi U + \phi D$) will indicate the velocity of sound and the output of the difference amplifier 54 ($\phi U - \phi D$) will indicate the magnitude and direction of the measured fluid flow when corrected by the voltage-controlled attenuator 56 as will be explained. The output of the summing amplifier is connected to a phase-locked loop filter and error amplifier 60 and to a sawtooth generator 62 both of which are alternately connected to a voltage-controlled oscillator (VCO) 64 via a switch 66. The output of the VCO 64 is connected back to the phase detector 40 and to a frequency-to-voltage converter 68. The frequency-to-voltage converter 68 provides a more linear voltage-versus-frequency output than is available from the VCO input voltage since the VCO devices have been found to be nonlinear from one production unit to another due to manufacturing tolerances, etc. The output of the frequency-to-voltage converter 68 is connected back to the voltage-controlled attenuator 56.

Also in this embodiment, the circuitry which comprises the previously mentioned nonlinear function generator 14 and the voltage-to-phase-shift converter 16 are connected in series to the output of the frequencyto-voltage converter 68. Also connected to the output of the frequency-to-voltage converter is the circuitry which comprises the previously mentioned function generator 22 whose output is connected to one input of the comparator 20. The second input of comparator 20 is connected to the output of the envelope detector 18. The output of the comparator controlling switch 66 is indicated by the dotted line 70. In this embodiment, the output of the VCO 64 is connected in these paths: to the frequency-to-voltage converter 68, to the voltage-to-phase shift converter 16 and to the phase detector 40. The output of the voltage-to-phase shifter 16, in turn, is connected to a phase shifter 72 whose output is connected to a square-to-sine wave converter 74. The output of the square-to-sine wave converter 74 is connected back to the switch 34.

To simplify the disclosure of this system herein, control logic circuitry 76 is shown connected to switch 34 between the transducer elements 30 and 32, the phase detector 40 and to switch 50 between the integrator 42 and the upstream and downstream sample-and-hold circuits 44 and 46. This control logic circuitry 76 is also connected to a plurality of switches for operating the signal integrator 42 and to provide for the operation of the upstream and downstream sample-and-hold circuits. Again, reference can be made to the Hall and Loveland patent and the patent and applications, supra, for an understanding of this portion of the circuitry, and it is understood that while all the switches are shown as mechanical switches, they are, in fact, fast operating transistors, such as MOSFETS.

As shown in this figure, the ultrasonic transducer elements are alternately switched into the transmit or receive mode by the control logic circuitry 76. Thus, while one transducer element is receiving, the other transducer element is transmitting.

Ignoring for the moment the two circuits involving the two nonlinear function generators 14 and 22 and, considering the VCO 64 as connected directly to the phase shifter 72, as explained in the Hall and Loveland patent and in the patent and applications, supra, for each transmit/receive cycle, the phase difference between the transmit signal and the received signal is detected by the phase detector 40. The average value is determined for each transmit/receive cycle by the integrator 42 which goes through an integrate, hold and reset mode for each transmit/receive cycle. During each integrate/hold period, the respective sample-and-hold circuit for the upstream phase and the downstream phase is ready to accept a new signal (sample mode) as data is available at the integrator output. The upstream and downstream sample and hold circuits are updated with new data at the end of each respective transmit/receive cycle and store (hold) the information during the wait period.

At the difference amplifier, the stored values are then subtracted with the output indicating the direction and the magnitude of the fluid flow ($\emptyset U - \emptyset D$) when corrected by the voltage-controlled attenuator 56. In addition, the same stored values are added together in the summing amplifier 52 ($\emptyset U + \emptyset D$) to determine if a common mode change has occurred in the density of the fluid medium. A common mode change is caused by a change in the velocity of the sound traveling through the fluid which, in turn, may be due either to a temperature or a fluid species change. The result is that the sum of the upstream and downstream data ($\emptyset U + \emptyset D$) held by the respective sample-and-hold circuits, changes in a manner which causes an error signal at the VCO input to change the transmit frequency in a direction which returns the wavelength of the sound impulse frequencies into its original value thereby keeping the wavelength constant. Stated in another way, the purpose of the VCO is to maintain the frequency of the transmitted signals in phase with the signals being received at the phase detector, that is, the frequency of the signals at the input of the phase detector 40 are maintained in phase with the signals at switch 36.

As mentioned in the BACKGROUND OF THE INVENTION in connection with FIG. 1, the system was unable to cope with variations in phase and amplitude necessary to monitor all the gases of the type used in anesthesiology because of the limitations of the phase-locked loop and, in order to overcome this limitation, the system is provided with means to enable the system to operate over a wider range of gas densities. This means causes the operating phase of the system phase-locked loop to vary in a continuous manner according to the previously determined relationship of phase-versus-frequency and the acquisition frequency of the phase-locked loop to vary in a continuous manner according to the previously determined relationship of amplitude-versus-frequency applied to the comparator 20, the operating frequency and acquisition frequency being dependent upon the gas being monitored. The means for compensating for the variation in phase-versus-frequency characteristics of the transducer can be done in a number of ways and the means for compensating for the variation in amplitude-versus-frequency characteristics of the transducer can be used with any of the selected phase-versus-frequency and amplitude-versus-frequency compensating means, or any number of other conventional digital or analog means without affecting the intent of this invention or performance of the system.

The preferred embodiment of this invention is illustrated in FIG. 2. In this embodiment, the phase-versus-frequency compensating means, which comprises the nonlinear function generator 14 and voltage-to-phase shift converter 16, is positioned outside the loop between the phase detector 40 input/output and the VCO 64. So positioned, the system is matched to the previously determined relationship of phase-versus-frequency of the gases being monitored.

How this phase-versus-frequency compensating means functions in the flowmeter system will now be described in connection with FIGS. 3 and 4.

Figure 3:
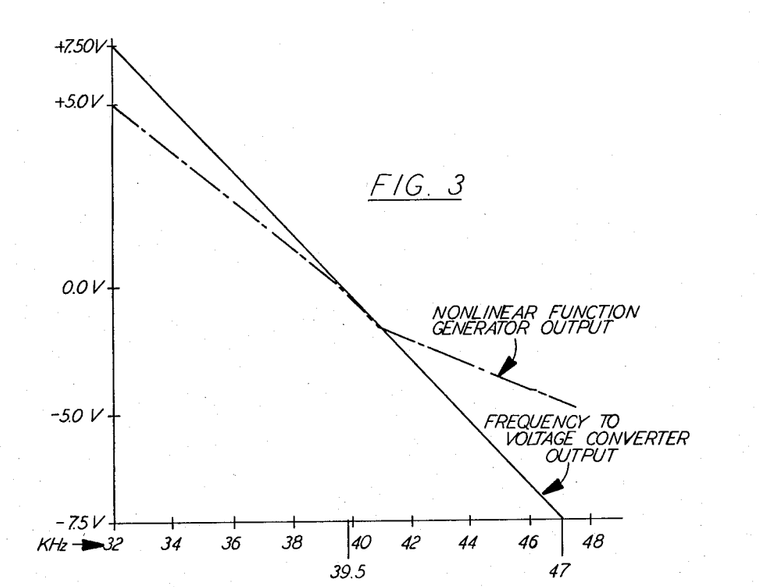
FIG. 3 is a graph showing the output of a frequency-to-voltage converter compared with an output as attenuated by a nonlinear function generator for use in the phase compensating means.
Figure 4:
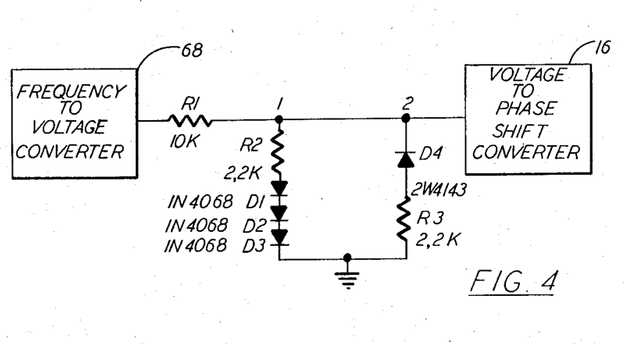
FIG. 4 is simplified schematic of one type of nonlinear function generator which may be used to perform the attenuation as shown in FIG. 3.

As shown in FIG. 3, a graph of voltage-versus-frequency, the output from the frequency-to-voltage converter 68 varies in a straight line from approximately +7.5 volts at 32 KHz to −7.5 volts at 47 KHz. The nonlinear function generator 14 attenuates the upper portion of the converter output so that at approximately +2.0 volts the output is attenuated and approaches +5.0 volts at 32 KHz and, at slightly less than 0.0 volts, the output is attenuated to approximately −2.5 volts at 47 KHz. This attenuation can be accomplished in a number of ways: a typical circuit being shown in FIG. 4 as an example of a nonlinear function generator which may be used. As shown, the output from the frequency-to-voltage converter 68, is connected via a resistor R1 to an attenuating circuit which comprises a resistor R2 and three diodes D1, D2 and D3, in series; the anode of D1 is connected to resistor R2, the latter being connected at node 1 to resistor R1 and the cathode of D3 being connected to ground. On the other side of the ground connection is a second resistor R3 and a fourth diode D4 having its cathode connected directly to the first resistor R1 at node 2 and to the voltage-to-phase shift converter 16. In operation, diodes D1, D2, and D3 will conduct current only when frequency-to-voltage converter 68 output voltage is positive with respect to ground potential, and diode D4 will conduct current only when the output of frequency-to-voltage converter 68 is negative with respect to ground potential. Since the voltage across a diode is nonlinear with respect to current through the diode (typically reaching about 0.65 volts across each diode with maximum rated current), the voltage applied to the voltage-to-phase shift converter 16 will vary in a correspondingly nonlinear manner.

Figure 5:
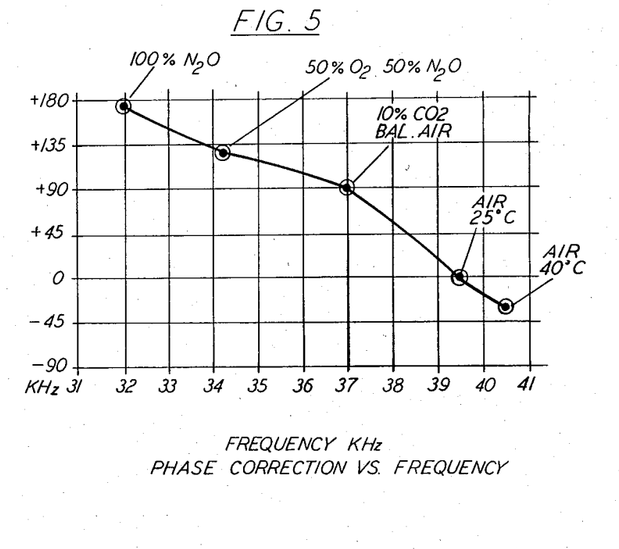
FIG. 5 is a graph showing the phase correction versus-frequency accomplished by the preferred embodiment of this invenion through the operation of the circuitry of FIG. 4, FIGS. 6A-C depict a voltage-to-phase shift converter which may be used in this invention and graphs of timer input voltage/nonlinear function generator output-versus-phase shift.

Now to compare the attenuated curve of FIG. 3 with the resonant frequencies of the gases of FIG. 1, attention is now directed to FIG. 5 showing the output of the nonlinear function generator plotted against the resonant frequencies of the various gases. The plotted points can be compared with the FIG. 1. As can be seen in this graph and in Table I, the transducer ideal operating phase and the actual transducer operating phase for the various gases are the same.

Figure 6A:
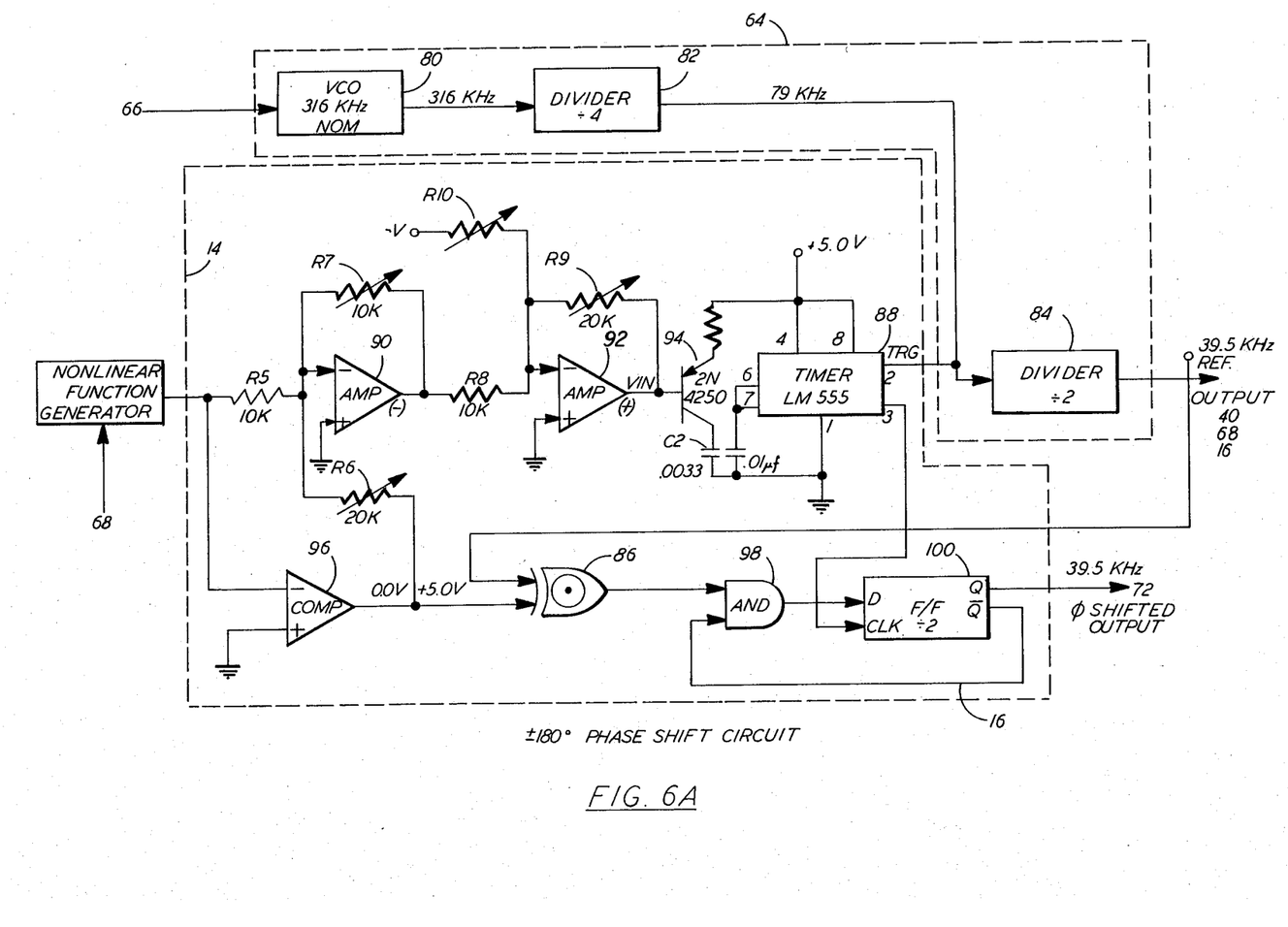

AND gate is connected to the D input of the flipflop 100. The output of the nonlinear function generator 14 is connected to the inverting input of the first amplifier 90 through resistor R5 and to the inverting input of the comparator 96. The output of the comparator 96, in addition to being connected to the Exclusive NOR gate 86, is connected via a variable resistor R6 to the inverting input of the first amplifier 90. The first amplifier 90 with resistor R5 and R7 has unity gain and is connected to the inverting input of the second amplifier 92 via resistor R8. The output of the second amplifier 92 is provided with an adjustable variable resistor R9 which allows variation in gain at its positive output and may be provided with an additional bias adjustment for a source of negative voltage via a variable resistor R10. The positive output of the second amplifier 92 is connected to the base of the transistor 94. Timer 88 is LM555 integrated circuit type timer available from National Semiconductor and illustrated in National's "Linear Data" book, 1978, Page 9.31 under "Linear Ramp". The function of the transistor 94 and capacitor C2 with timer 88 is described in the National book.

The output pin 3 of the timer is connected to the clock input of the flipflop 100. The Q output pin of the flipflop 100 is connected to the second input of the AND gate 98 and, finally, the Q output of the flipflop 100 forms the 39.5 KHz shifted output of the voltage-to-phase shift converter 16.

Figure 6B:
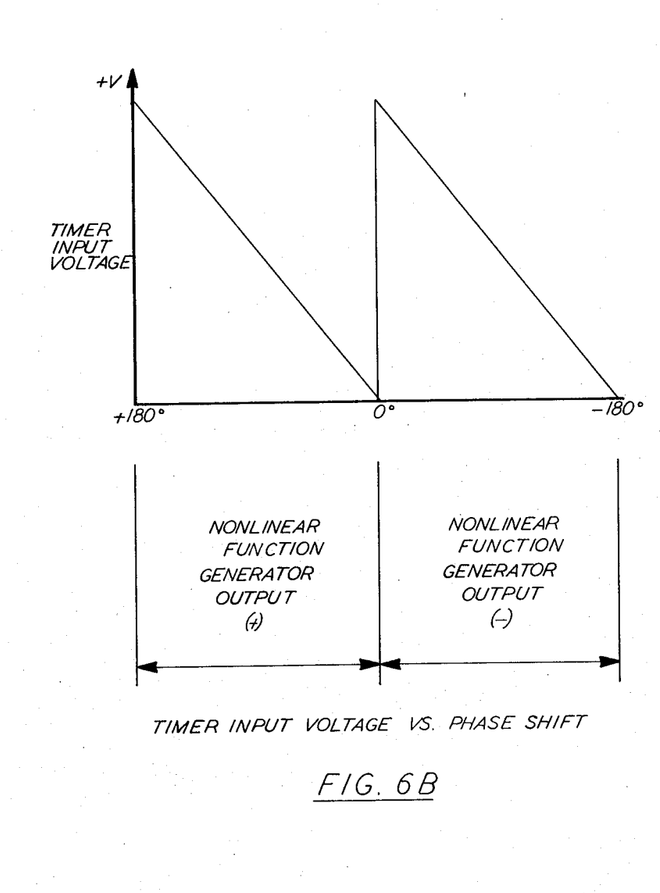
Figure 6C:
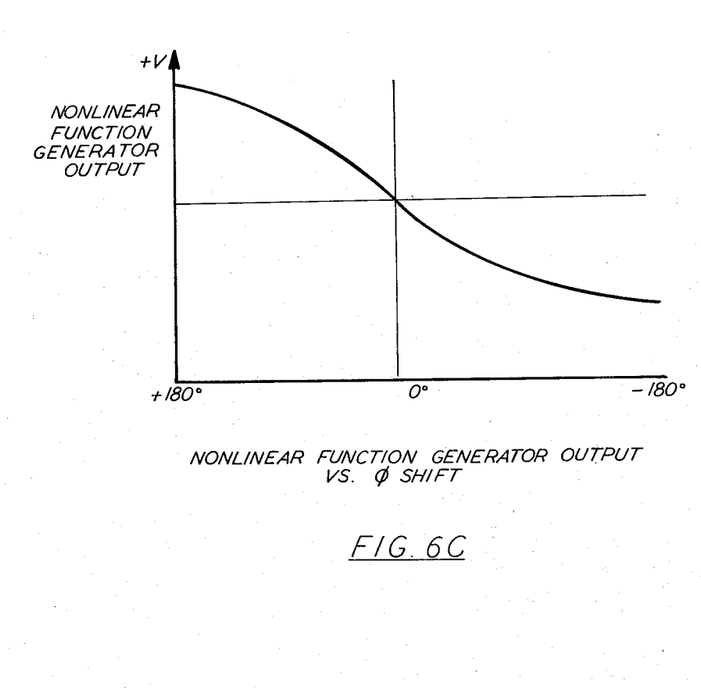
Figure 7:
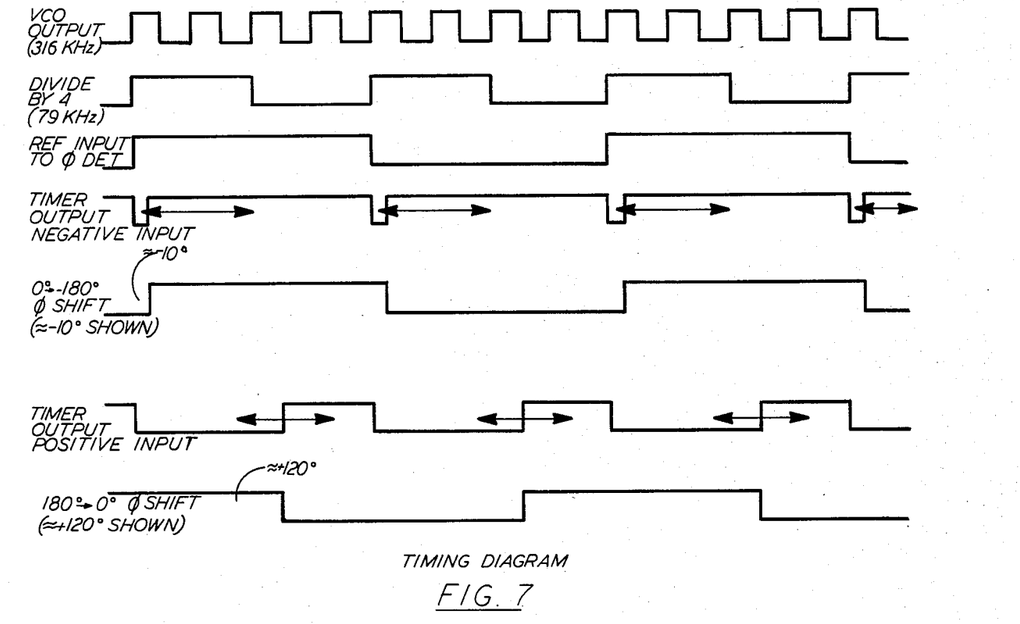
FIG. 7 is a timing diagram of the voltage-to-phase shift converter of FIG. 6A.

The operation of the voltage-to-phase shift converter 16 is a function of the output from the nonlinear function generator 14 and thus the output curve of FIG. 3 must be considered together with the graphs of FIGS. 6B and 6C and the timing diagram of FIG. 7.

Before describing the voltage-to-phase shift converter operation, certain comments are in order. First, the output from the nonlinear function generator 14 shifts from a positive voltage to a negative voltage and vice versa depending upon the gas in the transducer. Secondly, the function of the timer circuitry requires its input to be always a positive voltage. Thirdly, in order to handle the phase-shift of more than 180°, the converter 14 must provide an inversion technique so that the voltage input to the timer circuitry is always positive even though a negative voltage may be generated at certain times by the nonlinear function generator.

Now assume the condition where the nonlinear generator output is positive, for example, when the gas in the transducer is 50% $O_2$ and 50% $N_2O$. This positive voltage is applied both to amplifier 90 and to comparator 96. With a positive voltage at the input of the comparator 96, the comparator output is 0.0 volts so that no

TABLE I

| Gas | Xdr Ideal Oper. Phase | Phase Corr. | Fixed Phase Shift | Actual Xdr. Oper. Phase | Compensated Phase Error From Resonance | Compensated Freq. Error From Resonance |
| --- | --- | --- | --- | --- | --- | --- |
| Air −25° C. (39.5 KHz) | 0° | 0° | 0° | 0° | 0° | 0 Hz |
| 10% $CO_2$ (37 KHz) | +90° | +90° | 0° | +90° | 0° | 0 Hz |
| 50% $O_2$ 50% $N_2O$ (34.7 KHz) | +130° | +130° | 0° | +130° | 0° | 0 Hz |
| 100% $N_2O$ (37 KHz) | +170° | +170° | 0° | +170° | 0° | 0 Hz |
| Air −40° C. (40.3 KHz) | −30° | −30° | 0° | −30° | 0° | 0 Hz |

FIG. 6A illustrates the VCO 64, the nonlinear function generator 14 and the voltage-to-phase shift converter 16. In order for the output of the VCO 64 to be at 39.5 KHz, as shown in FIG. 2, the output of a VCO 80 operating at 316 KHz is first divided by a divide-by-4 divider 82 and by a divide-by-2 divider 84. This 39.5 KHz reference output is connected to one input of an Exclusive NOR gate 86 forming part of the circuitry of the voltage-to-phase shift converter 16. The output of the divide-by-4 divider 82 is also connected to pin 2 of a timer 88, also forming part of the voltage-to-phase shift converter 16. (While FIG. 2 shows the output of the VCO 64 operating at 39.5 KHz as the only connection to the voltage-to-phase shift converter, this was done for simplicity. There are actually two connections from the VCO to the voltage-to-phase shift converter in the disclosed circuitry).

Like the nonlinear function generator 14, the voltage-to-phase shift converter 16 can be made in a number of ways so long as it will handle phase shifts of more than 180°. One way is illustrated in FIG. 6A as including two operational amplifiers 90 and 92 in series with timer circuitry which includes a PNP transistor 94, capacitor C2 and timer 88. A third operational amplifier or comparator 96 is connected to the output of the nonlinear function generator and its output is connected to the other input of the Exclusive NOR gate 86 whose output forms one input to an AND gate 98. The output of the current therefrom is applied to the variable resistor R6 nor to the input of amplifier 90. A positive voltage input to the inverting input of amplifier 90 causes a negative voltage at the amplifier output which, in turn, is applied to the inverting input of amplifier 92. The output (Vin) from amplifier 92 is positive and the amplitude of the signal will be proportional to the amplitude of the positive output voltage from the nonlinear function generator 14. The output from the timer 88 is a function of the voltage input Vin. More specifically, it is a function of the charge in the capacitor C2 by reason of the amount of positive bias applied to the base of the transistor 94. The timer output is directed to the clock input of the flipflop 100. At the same time the 39.5 KHz reference output is applied to one input of the exclusive NOR gate 86. The 0.0 voltage input from comparator 96 is applied to the other input to the Exclusive NOR gate. A zero volt level to the Exclusive NOR gate from the comparator causes an inversion of the signal applied to the one input of AND gate 98. The $\bar{Q}$ output of the flipflop 100 is also applied to the AND gate and the output of the AND gate is applied to the D input to the flipflop during the negative portion of the 39.5 KHz reference output, providing the 39.5 KHz phase shifted output to the digital phase shifter 72 which varies over a phase range from +180° to 0.

Thus, when the output from the nonlinear function generator 14 is in the range slightly above 0.0 volts or is generating a positive voltage, the comparator output voltage is 0.0 volts causing the output of the second amplifier 94 to be above 0.0 volts. The bias adjustment via resistor R9 can be used to insure that the input to the timer circuitry is set to the correct positive bias voltage and R10 can be adjusted to provide the desired degree of phase-shift versus input voltage from the nonlinear function generator.

Now if the nonlinear function generator is slightly below 0.0 volts, or is generating a negative voltage, for example, when air at 40° C. is in the transducer, the output from the comparator will be +5.0 volts. This output provides a positive bias current through resistor R6, causing the output from amplifier 90 to be negative and the output from amplifier 92 to be positive. The positive voltage level will equal amplitude of the negative voltage from the nonlinear function generator combined with a positive voltage from the comparator which is adjustable via R6. The resistor R6 is adjusted for correct Vin when the output from the nonlinear function generator is negative. This input voltage Vin (the output from amplifier 94) is applied to the timer circuitry and the output of the timer is applied to the clock input of the flipflop 100, as before. However, a +5.0 volt level output from the comparator 96 does not cause an inversion of the signal through the Exclusive NOR gate, as was the case when the nonlinear generator output was positive, the output of the Exclusive NOR gate and the output from the $\bar{Q}$ output from the flipflop are applied to the AND gate and the latter's output is applied to the D input of the flipflop during the positive portion of the 39.5 KHz reference output. The Q output of the flipflop now provides a phase-shifted output to the digital phase shifter 72 which varies over a phase range from 0° to -180°.

It can be appreciated that when air at 25° C. is in the transducer and the system is calibrated the phase-shift circuitry can be adjusted so that the output from the comparator will reflect 0.0 voltage output or slightly above 0.0 V. Of course, any or all of the above linear circuitry, including the VCO and the LM 555 timer, could be replaced with equivalent digital circuitry without adversely affecting circuit operation.

Before describing the two other embodiments of the phase compensating means, the means for compensating for amplitude variation-versus-gas density will be described in detail as part of the preferred embodiment of this invention. This latter means has also been referred to as the "phase-locked loop acquisition frequency means".

Figure 8:
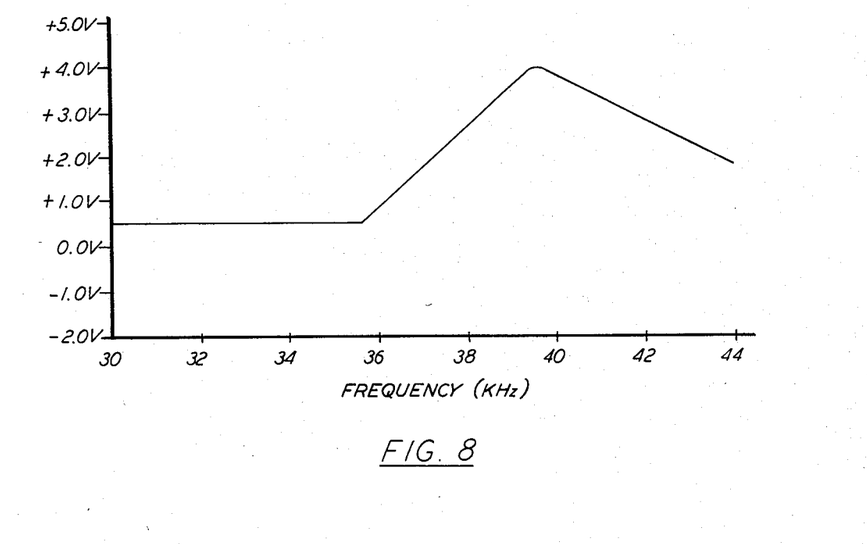
FIG. 8 is a graph of voltage-versus-frequency showing the nonlinear voltage curve generated by a nonlinear function generator in the amplitude compensating means.

As stated before, the means for compensating for amplitude-versus-gas density is important and, to understand its need, attention is directed back to FIG. 1. In this Figure, it can be seen that the amplitude attenuation at the resonant frequency of the transducer in air at 25° C. is approximately 46 db, while in 10% $CO_2$, balance air, the amplitude attenuation is approximately 38 db, whereas the amplitude attenuation with 50% $O_2$, 50% $N_2O$ drops to about 53 db and finally, the amplitude attenuation with 100% $N_2O$ drops to about 69 db. In order to compensate for these db variations, the flowmeter phase-locked loop system is provided with the nonlinear function generator 22 which generates an output curve as shown in FIG. 8. As shown in this figure, the output generated is constant and of about 0.5 volts between 30 KHz and about 35 KHz and gradually linearly increased to about 37 KHz where a peak of 4.0 volts is reached. Thereafter, the voltage degreases linearly to about 1.5 volts at about 44 KHz. It is the purpose of the output voltage of this nonlinear function generator to provide a threshold reference for the comparator 20 where, as shown in FIG. 2, the nonlinear function generator is connected to the positive, or non-inverting, input of the comparator 20. How this functions in the system will be clear from the description of FIG. 9.

Figures 9, 10:
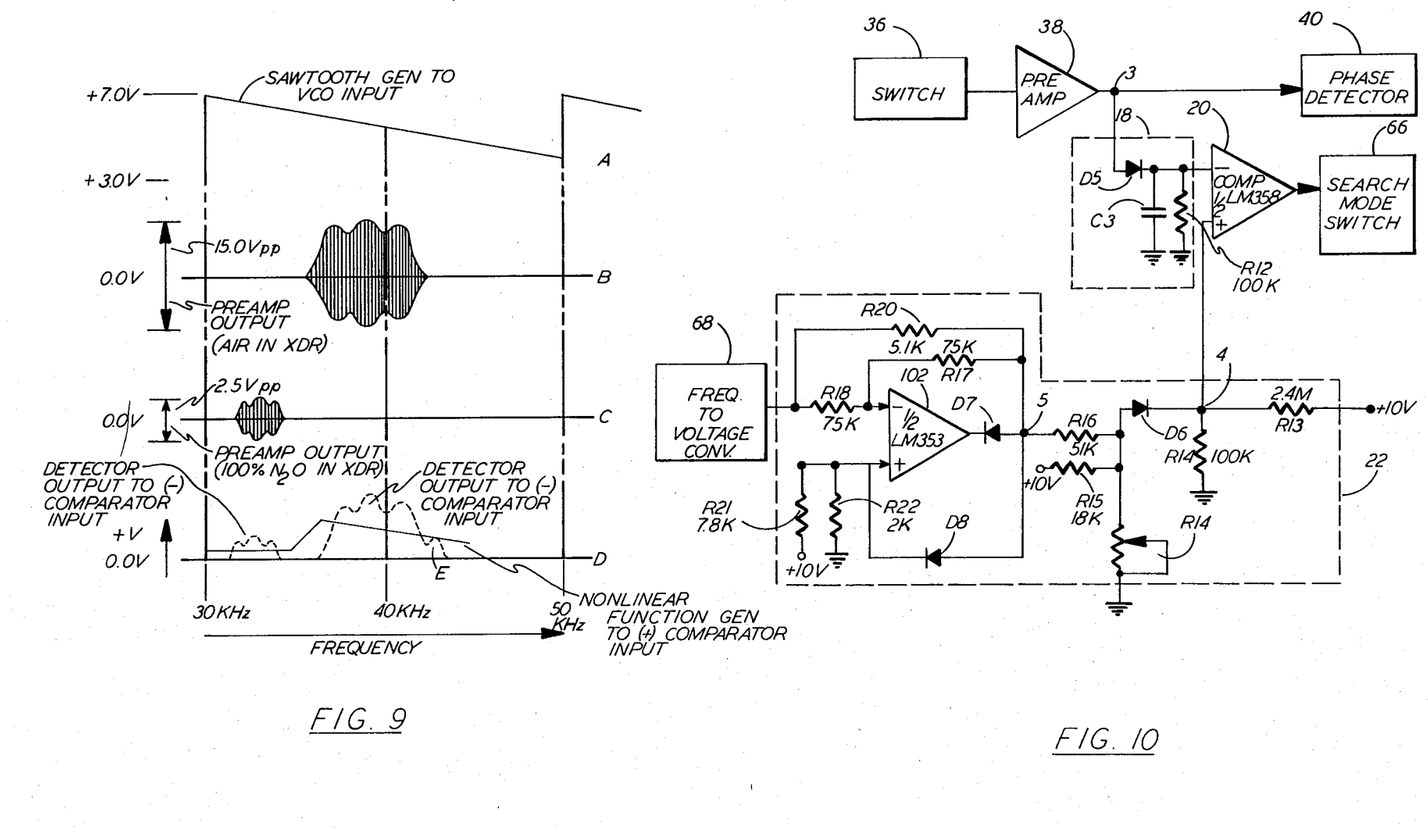
FIG. 9 is a combined chart showing the curve of FIG. 8 and the operation of the amplitude compensating means.
FIG. 10 is a simplified schematic diagram of an amplitude compensating means which generates the nonlinear curve shown in FIG. 8.

FIG. 9 is a chart of several graphs A-D to show the combined function of the sawtooth generator 62, the envelope detector 18, the comparator 20 and the nonlinear function generator 22.

Curve A is a typical output from the sawtooth generator which, when switched into the circuit via switch 66, provides a sweep of the frequencies of the VCO from approximately 30 KHz to 50 KHz.

Curve B illustrates a typical output from the transducer 10 of one of the upstream or downstream received signals as amplified by the preamplifier 38 with air in the transducer 10 and with the sawtooth generator 62 switched into the circuit by the switch 66. Typically, at resonant frequency of 39.5 KHz, the output from the preamplifier 38 is approximately 15 volts peak-to-peak.

Curve C illustrates a typical output from the transducer 10 of one of the upstream or downstream received signals as amplified by the preamplifier 38 with 100% $N_2O$ in the transducer 10. Again, the sawtooth generator 62 is switched into the circuit by switch 66. Typically, at the resonant frequency of about 32 KHz, the output from the preamplifier 38 is approximately 1.5 volts peak-to-peak.

Note that the positive and negative going voltage signals are shown in Curves B and C while in FIG. 1 only the positive going envelope of these signals were shown. It is these envelope signals which appear at the output of envelope detector 18.

Curve D is a composite of Curves B and C and output curve of FIG. 8 from the nonlinear function generator 22 (FIG. 2). In this curve D, the amplified outputs from preamplifier 38, representing the amplitude envelopes of Curves B and C, are shown only in dotted lines. It can be seen that the output from the linear function generator 22 is at less voltage than the amplitude peaks of the gas being monitored. Thus, during normal operation of the flowmeter phase-locked loop system, the threshold voltage applied to the non-inverting input of comparator 20 is less than that detected by the envelope detector 18 and applied to the inverted input of the comparator. During this condition, switch 66 is in the position shown in FIG. 2 and the output of the phase-locked loop filter and error amplifier 60 is being applied to the input of the VCO 64. While the output of the nonlinear function generator 22 is at less voltage than the amplitude peaks of the gas being monitored, it will have a higher voltage than the peaks of the spurious resonant frequencies which occur at 360° out of phase with the main amplitude peaks. An example of one of these spurious peaks is shown at E in line D of FIG. 9.

In the aforementioned normal monitoring condition, the applied reference voltage from the nonlinear function generator 22 is less than the peak voltage signal from the envelope detector 18. However, should the gas change abruptly, the system may go out-of-lock, especially if the gas density change is severe. For example, if the transducer 10 were monitoring air and suddenly 100% $N_2O$ were introduced into the transducer 10, the envelope detector then monitoring a 15 volt peak-to-peak envelope, suddenly encounters a 1.5 volt peak-to-peak envelope signal, the system may not be capable of following this change rapidly enough, and go out-of-lock. The reason for this is that the output from the envelope detector 18 suddenly becomes less than the threshold voltage reference from the nonlinear function generator 22. When this event occurs, the comparator 20 switches the switch 66 to disconnect the phase-locked loop and error amplifier 60 and to connect the sawtooth generator 62 into the circuit. The ouput from the sawtooth generator 62 causes the VCO 64 to sweep the frequencies from 30 KHz to 50 KHz until a condition exists where the comparator input from the envelope detector is higher than the threshold reference. When the latter occurs, the switch 66 is again returned to the position where the phase-locked loop filter and error amplifier 60 is applied to the VCO 64.

This same state of out-of-lock mode can occur when an impediment is introduced into the transducer 10 causing the envelope detector 18 to reduce its output voltage. The sawtooth generator 62, in this case, will continue to sweep the frequencies until the impediment is removed.

FIG. 10 illustrates the details of the circuit which accomplishes the operation of the flowmeter system as described in connection with FIGS. 8 and 9. In these figures, box 36 represents the transducer switch 36, shown connected to the preamplifier 38 and to the phase detector 40 in FIG. 2. At node 3 between the preamplifier 38 and the phase detector 40 is a first diode D5, whose cathode is connected to a capacitor C3 and resistor R12, both of which are connected in parallel to ground. The cathode of diode D5 is also connected to the inverting input terminal of the comparator 20. Diode D5, capacitor C3, and resistor D12 function as the envelope detector 18. The output of the comparator 20 is connected to switch 66 and the non-inverting input terminal of the comparator is connected at node 4, first, to a resistor R13 which, in turn, is connected to a source of positive voltage (+10 V), to a third resistor R14, whose opposite side is connected to ground, and to the cathode of diode D6. The anode of diode D6 is connected to a grounded potentiometer R14 to adjust the positive DC bias voltage applied to the anode of the diode D6. The anode of diode D6 is also connected to resistor R15 which, in turn, is connected to a source of positive voltage (+10 V). Connected to the junction of resistor R14 and resistor R15 and to the anode of diode D6 is still another resistor R16 connected at node 5 to the output of differential amplifier 102 via a diode D7. Differential amplifier 102 is an operational amplifier with a resistive negative feedback network comprising resistors R17 and R18 connected to the inverting input of amplifier 102 and with a diode D8 in the positive feedback network connected to the non-inverting input terminal of the amplifier. A second negative feedback loop with resistor R20 of the amplifier 102 is connected to the frequency-to-voltage converter 68 at node 6. The non-inverting input to amplifier 102 is connected in parallel to two resistors R21 and R22. The other side of resistor R21 is connected to a source of positive voltage (+10.0 V) and the other side of resistor R22 is connected to ground.

For the operation of nonlinear function generator, (FIG. 10) reference is made to the graph of FIG. 8, which is the threshold reference voltage applied to the non-inverting input of comparator 20. The operation of the nonlinear function generator will be described in three portions, (1) 32 KHz to 35.5 KHz, (2) 35.5 KHz to 37.5 KHz, and (3) 37.5 KHz to 44 KHz.

32 KHz to 35.5 KHz

The voltage divider formed by resistors R21 and R22, FIG. 10, is connected from +10 VDC to ground, developing a +2.0 VDC reference voltage which is connected to the non-inverting input of amplifier 102. The output of frequency-to-voltage converter 68 is 0.0 VDC at 39.5 KHz, and varies at −1 VDC per KHz; therefore, from 32 KHz to 35.5 KHz, the voltage applied to resistors R18 and R20 varies from +7.5 VDC to +4.0 VDC. These voltages are more positive than the +2.0 VDC reference applied to the non-inverting input of amplifier 102, so the output of amplifier 102 is driven negative, reverse-biasing diode D7, and causing current to flow from ground through resistors R14, R15, and R16, which causes diode D6 to become reverse-biased. Therefore, over this frequency range, the potential applied to the non-inverting input of comparator 20 is determined solely by the voltage divider formed by resistors R13 and R14, which develops a reference voltage of +0.4 VDC, as shown in the first portion of FIG. 8.

35.5 KHz to 37.5 KHz

From 35.5 KHz to 37.5 KHz, the output of frequency-to-voltage converter 68 varies from +4.0 VDC to +2.0 VDC. Resistor R14 is adjusted so that at 35.5 KHz, diode D6 is just forward biased; this sets the initial point for the increasing slope of the second portion of the curve of FIG. 8. The steepness of the slope is determined by resistor R16. As the voltage applied to R18 and R20 decreases from +4.0 VDC to +2.0 VDC (frequency increases from 35.5 KHz to 37.5 KHz) the voltage at node 4 increases from +0.4 VDC to +4.0 VDC, which is shown as the second portion of the curve of FIG. 8.

37.5 KHz to 44 KHz

When the output of frequency-to-voltage converter 68 reaches slightly below +2.0 VDC (decreasing as frequency increases), the current through R22 into the inverting input of amplifier 102 reverses polarity (since the non-inverting input is referenced to +2.0 VDC), causing the output of amplifier 102 to be driven positive. This reverse-biases diode D7, and forward biases diode D8 (primarily through R20) effectively removing amplifier 102 from the circuit. Therefore, as the voltage applied from frequency-to-voltage converter 68 decreases, current through R20 decreases, causing the voltage at node 4 to decrease, forming the third portion of the curve of FIG. 8.

Having thus described the manner for compensating for the amplitude of the resonant frequencies of various gases, the remaining embodiments of the means for phase compensation for the phase-locked loop circuitry will be described in connection with FIGS. 11-14.

Figure 11:
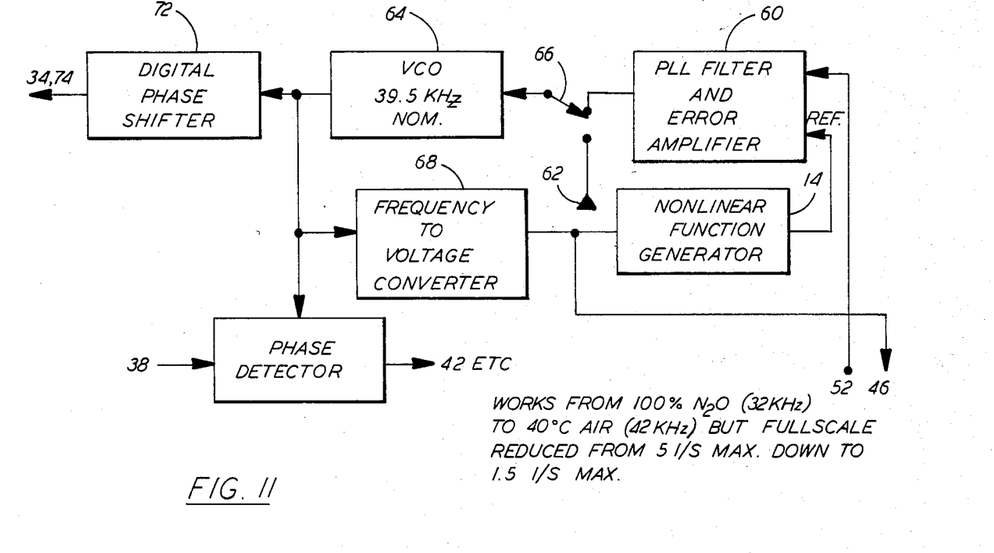
FIG. 11 is a simplified block diagram of a portion of the system circuitry with the nonlinear function generator positioned to change the phase-locked loop reference point nonlinearly.
Figure 12:
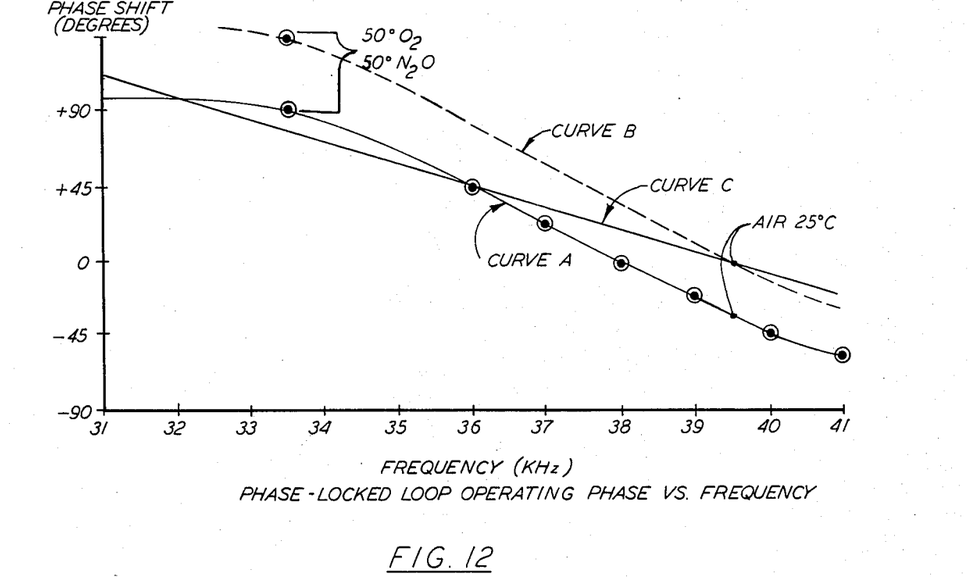
FIG. 12 is a graph showing the phase correction accomplished by the circuits of the second and third embodiments.

In FIG. 11, it can be seen that, in lieu of placing the nonlinear function generator 14 between the VCO 64 and the phase detector 40, the nonlinear function generator 14 is placed where it becomes a variable reference for the error amplifier (shown together with the phase-locked loop filter 60). A typical plot of phase-locked loop operating phase-versus-frequency is shown in FIG. 12, Curve A. Curve B represents the actual operating phase of the transducer which occurs by means of the fixed −45° phase introduced by phase shifter 72. The correlation of Curves A and B is illustrated in Table II.

whose optimum operating phase is +130, it can be seen that the actual phase-locked loop operating phase is +81°. This results in a full scale flow measurement limit of ±2.8 l/s. It becomes clear then that with 100% $N_2O$ and, with the system still calibrated in air at 25° C., the actual phase-locked loop operating phase is +96°. This results in a full-scale flow measurement limit of ±2.3 liters per second.

Figure 14:
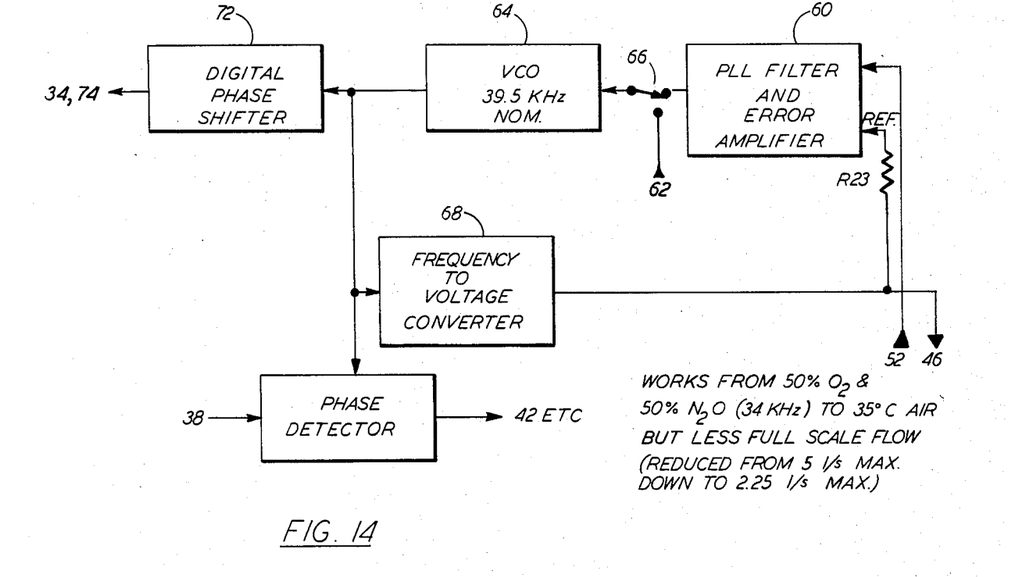
FIG. 14 is a simplified schematic like that of FIG. 11 except a resistor is used as a linear current source to change the phase-locked loop reference point linearly.

If the gas density range requirement is not as severe, a still simpler embodiment is possible. FIG. 14 illustrates how the reference may be changed in a linear fashion, by changing the reference of the error amplifier 60 connected directly to the output of the frequency-to-voltage-converter 68, through resistor R23 in which case the error amplifier 60 can be made to operate in a linear fashion. Again, while this will modify the system to operate over a wider gas density range than the original circuit, of the Hall and Loveland patent, whether or not modified by the patents and applications, supra, it is not sufficient for all of the gases in the anesthesiology environment. FIG. 12, Curve C, illustrates the straight line correction accomplished by the embodiment of FIG. 14.

What is claimed is:

1. A flowmeter system for measuring a fluid along a path comprising, in combination:
   means defining a path for confining a fluid flow;
   a first and second transducer element disposed along said path;
   a transducer control circuit coupled to said first and said second transducer elements to cause said first transducer element to produce first acoustic com-

TABLE II

| Gas | Trans. Ideal Oper. Phase | Fixed Phase Shift | Actual Trans. Oper. Phase | PLL Oper. Phase + Trans. Oper. Phase | Compensated Phase Error From Ideal (deg.) | Compensated (−5.5 Hz/deg.) Frequency Error From Ideal (Hz) |
|---|---|---|---|---|---|---|
| Air −25° C. (39.5 KHz) | 0° | −45° | +9° | −36° | +9° | −49.5 Hz |
| 10% $CO_2$ (37 KHz) | +90° | −45° | +67.5° | −22.5° | −22.5° | +123.5 Hz |
| 50% $O_2$ 50% $N_2O$ (34.2 KHz) | +130° | −45° | +126° | +81° | −4° | +22 Hz |
| 100% $N_2O$ (32 KHz) | +170° | −45° | +141° | +96° | −29° | +159.5 Hz |

The advantage of embodiment of FIG. 11 is that the variable phase-shifter circuit 16 is not required. The major disadvantage of this implementation is that the full-scale flow measurement capability is reduced due to a reduction in phase detector range as will be explained in connection with FIG. 13.

Figure 13:
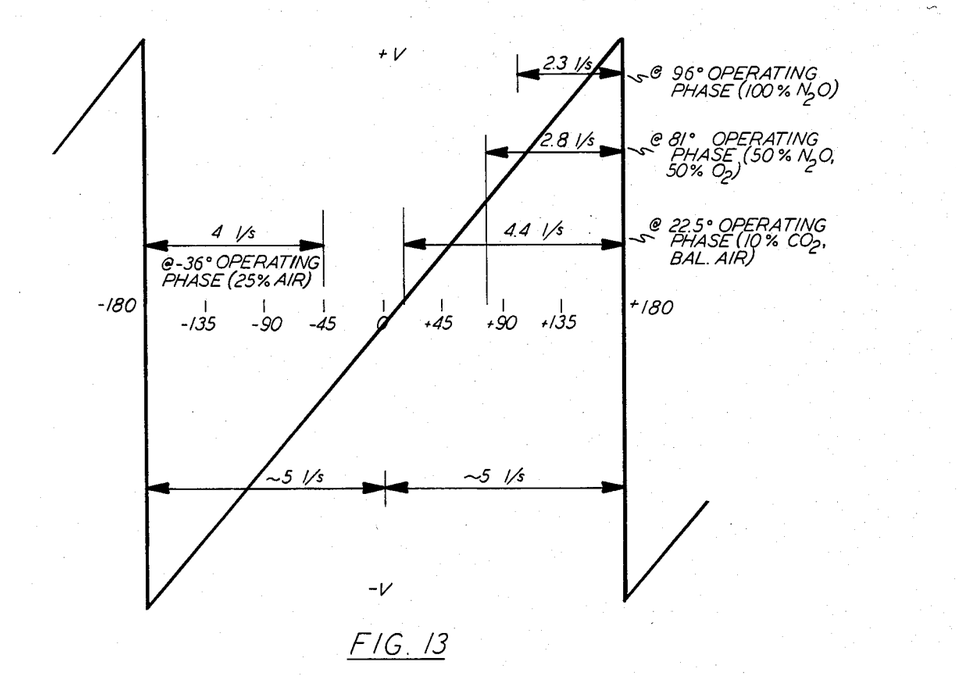
FIG. 13 is a graph (voltage-versus-frequency) of the output of a typical phase detector.

FIG. 13 illustrates the output of a typical phase detector with ±180° phase measurement capability and the zero crossover representing the mid-range where the system is normally calibrated at the resonant frequency of air at 25° C. The graph of FIG. 13 shows that this system is capable of monitoring approximately ±4 liters per second of air at 25° C., since the zero-flow operating phase of the phase detector is −36°. However, if a gas of 10% $CO_2$, balance air, is monitored, whose optimum phase of operation is at +90°, referring to FIG. 11, the actual phase-locked loop operating point is +22.5°. Thus, the system is fully capable of monitoring this latter gas but at a flow rate reduced to approximately ±4.4 l/s. Maintaining the system calibrated in air at 25° C. and introducing a gas which is 50% $O_2$ and 50% $N_2O$ pressions in the fluid in response to first transmit signals applied to said first transducer element and said second transducer element to produce a first received signal when said first acoustic compressions are sensed thereby during a first transmit-receive cycle and to cause said second transducer element to produce second acoustic compressions in the fluid in response to signals applied to said second transducer element and said first transducer element to produce a second received signal when said second acoustic compressions are sensed thereby comprising a second transmit-receive cycle;

said control circuit also including:
means to switch from said first to said second transmit-receiving cycle;
first measurement means to measure a first phase difference comprising the phase difference between the first acoustic compressions produced at said first transducer element and said first received signal produced by said second transducer element during each said first transmit-receive cycle;

second measurement means to measure a second phase difference comprising the phase difference between the second acoustic compressions produced at said second transducer element and said second received signal produced by said first transducer element during each said second transmit-receive cycle;

difference means responsive to said first and said second measurement means to produce a difference signal whose magnitude equals the difference between one said first phase difference and one said second phase difference wherein the magnitude of said difference signal is directly related to the instantaneous fluid flow rate and the algebraic sign of said difference signal represents the direction of fluid flow along the path; and means connected between said first and second measurement means and said transducer control circuit to automatically adjust the frequency of the acoustic compressions produced by each said transducer element to a frequency where a fixed wavelength distance, in the fluid flow medium, occurs across the distance between said transducer elements, thereby maintaining operation at the acoustic resonance to maximize the magnitude of the received signal produced at the other transducer element so that said difference signal output is insensitive to the velocity of sound in the fluid, and means included in said frequency adjusting means to vary the operating phase of the flowmeter system in a continuous manner according to a previously determined relationship of acoustic resonance of the flow path with fluids of difference densities therein.

2. The flowmeter system as claimed in claim 1 wherein the last mentioned means shifts the operating phase of the system according to a predetermined relationship of phase-versus-frequency response of the flow path with fluids of different densities therein.

3. The flowmeter system as claimed in claim 2 wherein said last mentioned means shifts the operating phase nonlinearly.

4. The flowmeter system as claimed in claim 3 wherein said last mentioned means comprises a nonlinear function generator.

5. The flowmeter system as claimed in claim 3 wherein said last mentioned means changes the resonant operating characteristic of the system in a nonlinear relationship.

6. The flowmeter system as claimed in claim 5 wherein said last mentioned means is a nonlinear function generator.

7. The flowmeter system as claimed in claim 6 further including an amplitude detector means for comparing the output from said nonlinear function generator on a threshold reference with the output from said amplitude detector, means for maintaining the resonant operating characteristic of the system so that the output from said amplitude detector is greater than the threshold reference.

8. The flowmeter system as claimed in claim 2 wherein said last mentioned means shifts the operating phase linearly.

9. The flowmeter system as claimed in claim 8 wherein said last mentioned means is a variable current source.

10. The flowmeter system as claimed in claim 1 wherein the last mentioned means includes means for compensating for amplitude variations of said first and second compressions relative to the density of the fluids in the flow path.

11. The flowmeter system as claimed in claim 1 wherein said last mentioned means changes the resonant operating characteristic of the system according to a predetermined relationship of amplitude-versus-resonant frequency of the flow path with fluids of different densities therein.

12. A phase-locked loop system for measuring fluid flow by detecting phase differences between a transmitted and received signal within a confined path having a voltage controlled oscillator, applying signals at a given frequency from said voltage controlled oscillator to said fluid in said flow path, a phase detector for detecting the phase difference between the received signal and the transmitted signal, means for generating an error voltage corresponding to said detected phase difference between the transmitted and received signal and applying said error voltage to said voltage controlled oscillator so that said transmitted signal will be maintained in operating phase with the received signal, and means for varying the operating phase between said transmitted signal and said received signal in a continuous manner according to a predetermined relationship of acoustic resonance of the confined path with fluids of different densities therein, wherein said means for varying is coupled to control the phase of said signals from said voltage controlled oscillator in cooperation with said means for generating an error voltage.

13. The phase-locked-loop system as claimed in claim 12 wherein said last mentioned means varies the operating phase of the system according to a predetermined relationship of phase-versus-resonant frequency.

14. The phase-locked-loop system as claimed in claim 12 wherein said last mentioned means compensates for variations in amplitude versus resonant frequency of the confined path.

15. The phase-locked-loop system as claimed in claim 12 wherein said last mentioned means varies loop acquisition frequency of the system according to a predetermined relationship of amplitude-versus-resonant frequency of the confined path and the fluid therein.

* * * * *